G. O. B. VON OBERSTADT.
SIGNALING DEVICE.
APPLICATION FILED FEB. 6, 1912.
1,071,948.
Patented Sept. 2, 1913.
2 SHEETS—SHEET 1.
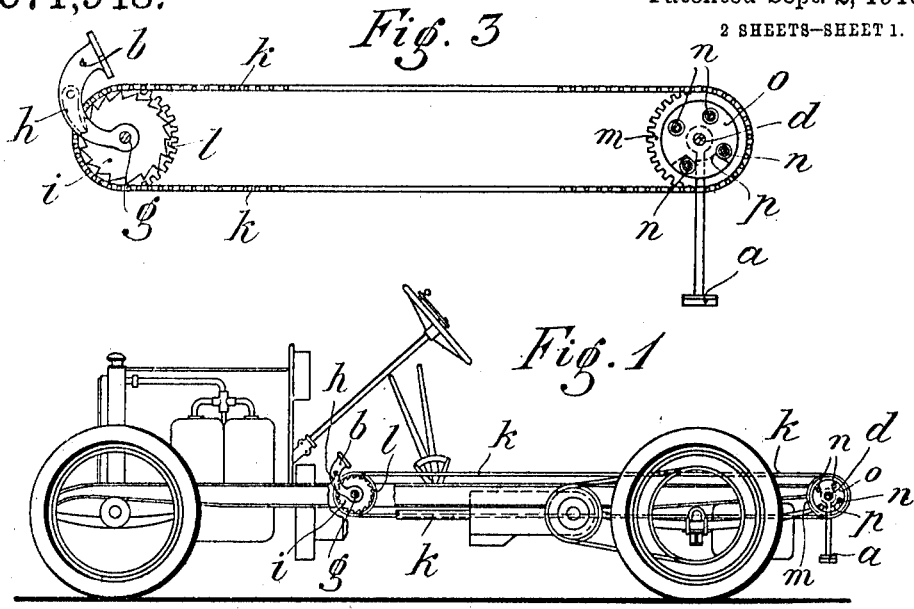
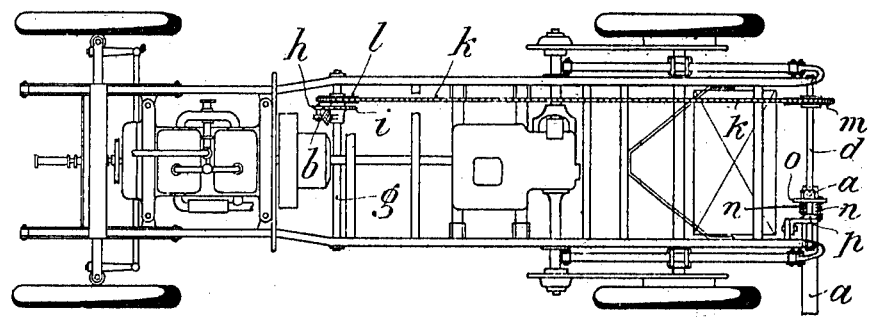
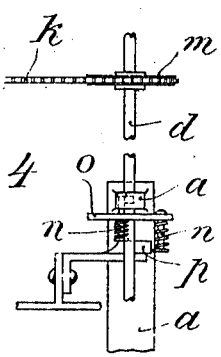
Witnesses
Inventor
Graf Oskar Bopp von Oberstadt
by
his Attorney

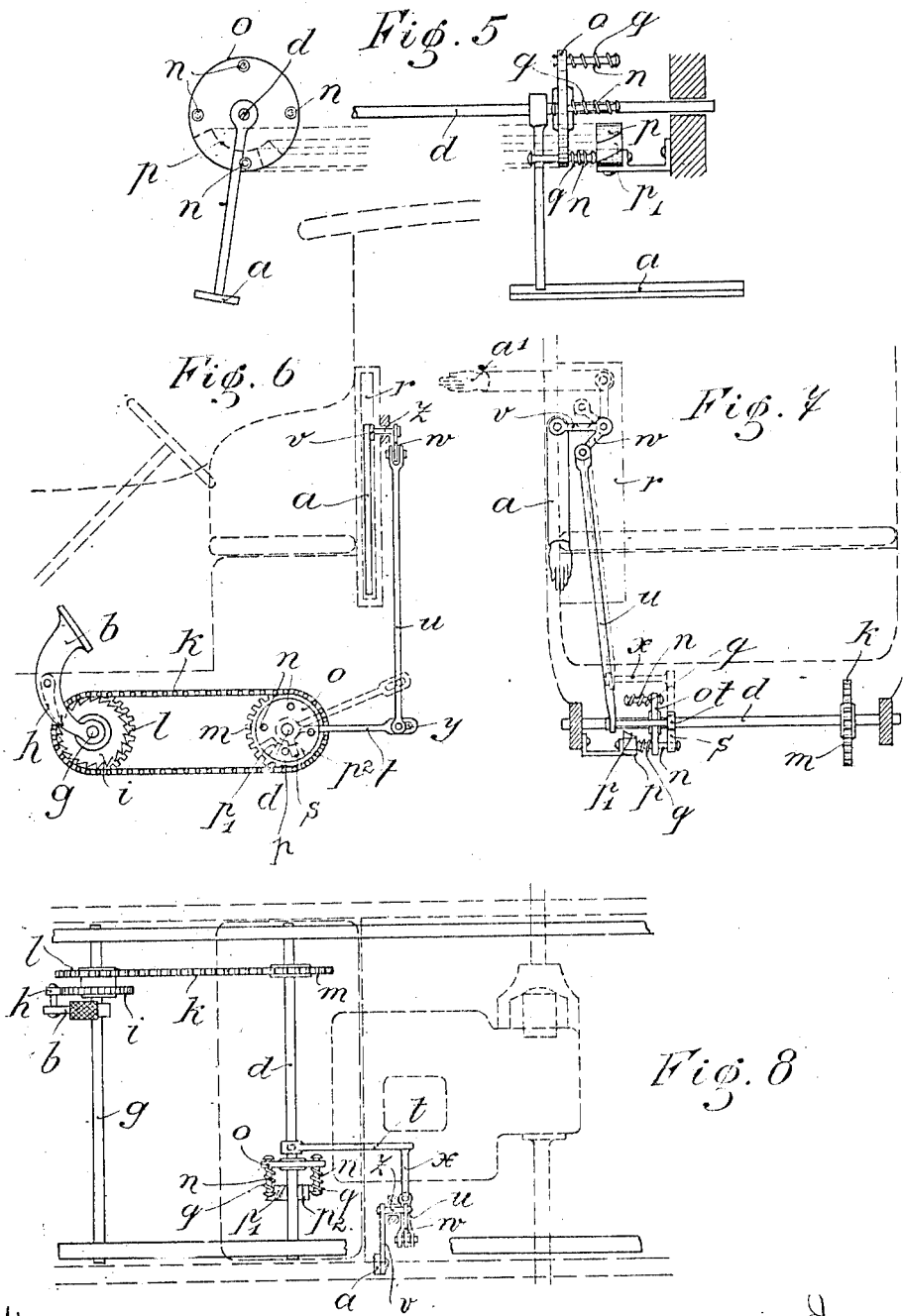

UNITED STATES PATENT OFFICE.

GRAF OSKAR BOPP von OBERSTADT, OF CHICAGO, ILLINOIS.

SIGNALING DEVICE 1,071,948.   Specification of Letters Patent.   Patented Sept. 2, 1913.

Application filed February 6, 1912. Serial No. 675,711.

*To all whom it may concern:*

Be it known that I, GRAF OSKAR BOPP VON OBERSTADT, citizen of Germany, residing at Chicago, Illinois, have invented certain new and useful Improvements in Signaling Devices; and I do hereby declare the following to be a full, clear, and exact description of the invention, such as will enable others skilled in the art to which it appertains to make and use the same.

For rapid road vehicles, especially for automobiles, signaling devices are already known, consisting of a signal arm adapted to be operated from the seat of the driver and serving, for instance, to announce the intention of turning a corner and so to keep a following vehicle in check and prevent a collision.

The present invention relates to such a signaling device, in which an automatic falling back of the signaling arm from its signal position is attained by simple and sure means. In order to accomplish this, the gear connecting the signaling arm with the lever, pedal or other organ used to operate said arm contains a catch or the like adapted to carry said arm into the signaling position and there to automatically release it. This catch may consist essentially of spring pins which move past a guide surface and are by this means brought into their operative position.

The signaling arm may be situated at the side of the driver's or servant's seat or at the back of the car; in the first case it may advantageously be formed in imitation of a man's arm. The connection of the signaling arm with the operative organ by the driver's seat may be accomplished in different ways, for instance, with the help of chain, belt or conical wheel gearing.

Two forms of the invention are illustratively exemplified by the accompanying drawing wherein—

Figure 1 is a side view of an automobile chassis provided with my invention; Fig. 2, is a top plan view thereof; Fig. 3, is a side elevational view of the mechnaism for operating the signaling arm; Figs. 4 and 5 are detail views showing the means for projecting pins against the signaling arm to operate the same; Fig. 6 is a side elevational view of a modified form of the invention wherein the signaling arm is arranged at the side of the driver's seat; Fig. 7, is a front view partly in section of the device shown in Fig. 6; and Fig. 8 is a top plan view of the modified form of the invention.

In the form of the invention shown in Figs. 1 to 5, the signaling arm is adapted to be directly moved through the intermediary of pins which are normally spring pressed out of range of the arm, and at certain times are adapted to be moved into contact with the arm to move the same into signaling position. In this form of the invention pedal-lever $b$ situated at a convenient distance from and opposite to the driver's seat operates by means of a pawl $h$ a ratchet-wheel $i$, operatively connected with a chain-wheel $l$ and situated together with the latter loosely on the axis $g$ of the pedal-lever $b$. From the chain-wheel $l$ an endless chain $k$, leads to the rear chain-wheel $m$, situated on and rigidly connected to the shaft $d$ carrying the signal arm $a$, so that the latter can be operated by the movement of the pedal-lever. The signal-arm $a$ is loosely connected to the shaft $d$ and is raised by one of the pins $n$ of a disk $o$ rigidly connected to the shaft $d$. These pins $n$ are generally kept back by springs and are pressed into the operative position for raising the arm by means of a guide surface $p$. The pins and the guide surface are so arranged that each time the pedal-lever is pressed down one pin comes into action, raising the signal-arm when passing over the guide surface $p$ and releasing the signal-arm when the guide surface is passed. The released signal-arm is returned to its initial position by a spring or by its own weight. The return of the pedal-lever to the initial position may be accomplished by means of a spring or counter-weight.

The modified form of the invention, in its essential details, is similar to the form shown in Figs. 1 to 5. In the modified form the signaling arm $a$ is connected by means of a bell crank lever $v$—$w$—$z$ with a link $u$, in turn connected by means of a rod $x$ with the bell crank lever $t$ provided with the short arms $s$, which lever is fixed to the shaft $d$, and the pins $n$ in the disk $o$ act against the lever $t$ to raise the link $u$ and move the arm into the signaling position indicated in dotted lines in Fig. 7, and denoted by the reference character $a'$. When the arm is out of signaling position it rests normally in the aperture $r$ at the side of the driver's seat.

In both forms of the invention the operation is substantially as follows: When pressure is applied to the foot pedal *b* the pawl *h* acts against the ratchet wheel *i* causing revolution of the sprocket wheel *l* which by means of the chain *k* revolves the wheel *n* and shaft *d*. As the shaft *d* revolves it carries around with it the disk *o*, in which the pins *n* are slidably mounted and are normally held out of operative position by means of the springs *q*. In the course of its revolution the disk *o* carries the pins against the guide *p* which is fixed to a suitable part of the frame of the vehicle. As one of these pins meets the inclined guide surface *p'*, the pin is forced inwardly against the tension of the spring and caused to ride on the lateral surface of the guide *p*, and in the first form of the invention the pin, as indicated in Fig. 5, takes directly against the signaling arm *a* and raises it into signaling position. In the second form of the invention the pin after having been moved outwardly by the inclined guide surface *p'* acts against the arm *s* of the lever *t* thereby raising the link *u* and the bell crank lever *v—w* thus forcing the indicating arm *a* into the position shown in dotted lines in Fig. 7, and denoted by *a'*.

While the pin which has been forced inwardly is traveling on the lateral surface of the guide it will of course, be kept in contact with either the arm *a* or the lever *t*, and when the pin is opposite the substantially plane surface $p^2$ of the guide, the pin will be pressed back into its initial position by the spring *q* and will be released from either the arm *a* or the lever *t*, enabling the signaling arm *a* to automatically return to a position where no signal will be given.

What I claim as my invention and desire to secure by Letters Patent, is:

1. A signaling device embodying therein a normally inoperative signaling member, normally inoperative means adapted to actuate said signaling member, means for actuating said actuating means, and means for rendering said first named actuating means temporarily operative to move said signaling member into signaling position when said second named actuating means is in operation.

2. A signaling device embodying therein a normally inoperative signaling arm, a series of pins for moving said arm into signaling position, means whereby said pins are retained out of operative relation to said signaling arm, means whereby said pins are successively set to actuate said arm, and means whereby said pins are moved to place said arm into signaling position.

3. A signaling device embodying therein a signaling arm normally in inoperative position, a disk carrying a series of pins adapted successively to coöperate in moving said arm into signaling position, means for normally holding said pins in inoperative position, means for revolving said disk, and means in the path of said pins for rendering the same operative successively to move said arm into signaling position.

4. A signaling device embodying therein a signaling arm normally in inoperative position, a revolubly mounted disk having a series of pins slidably mounted therein, springs for normally retaining said pins in inoperative position, means for revolving said disk, and a guide whereby said pins are successively moved into operative position to move said signaling arm into signaling position.

5. A signaling device embodying therein a pair of oppositely disposed parallel shafts, a disk fixed on one shaft, said disk having a series of pins slidable therein, a signaling arm normally in inoperative position, springs for holding said pins in inoperative position, a guide adjacent said disk and having a surface thereon adapted to successively move said pins into position whereby said arm is moved into signaling position, and gearing for transmitting motion from one shaft to another to revolve said disk.

In testimony whereof I hereunto affix my signature in the presence of two witnesses.

GRAF OSKAR BOPP von OBERSTADT.

Witnesses:
 RICHARD LEMP,
 A. V. W. COTTER.